United States Patent
Perry et al.

(10) Patent No.: US 6,303,901 B1
(45) Date of Patent: Oct. 16, 2001

(54) METHOD TO REDUCE DAMAGE TO BACKING PLATE

(75) Inventors: Michael D. Perry; Paul S. Banks, both of Livermore; Brent C. Stuart, Fremont, all of CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 09/558,144

(22) Filed: Apr. 21, 2000

Related U.S. Application Data

(63) Continuation-in-part of application No. 08/859,020, filed on May 20, 1997.

(51) Int. Cl.$^7$ ................................................ B23K 26/38
(52) U.S. Cl. .......................... 219/121.71; 219/121.71; 219/121.84
(58) Field of Search .................... 219/121.7, 121.71, 219/121.67, 121.68, 121.69, 121.73, 121.74, 121.84

(56) References Cited

U.S. PATENT DOCUMENTS

| | | | |
|---|---|---|---|
| 5,720,894 | * | 2/1998 | Neev et al. ........................ 216/65 |
| 5,948,172 | * | 9/1999 | Neiheisel ........................... 134/1 |
| 6,020,988 | * | 2/2000 | Deliwala et al. ................... 359/276 |
| 6,156,030 | * | 12/2000 | Neev ................................. 606/10 |
| 6,156,461 | * | 12/2000 | Grenon et al. ..................... 430/5 |
| 6,208,458 | * | 3/2001 | Galvanauskas et al. ........... 359/345 |

\* cited by examiner

*Primary Examiner*—Samuel M. Heinrich
(74) *Attorney, Agent, or Firm*—John P. Wooldridge; Alan H. Thompson

(57) ABSTRACT

The present invention is a method for penetrating a workpiece using an ultra-short pulse laser beam without causing damage to subsequent surfaces facing the laser. Several embodiments are shown which place holes in fuel injectors without damaging the back surface of the sack in which the fuel is ejected. In one embodiment, pulses from an ultra short pulse laser remove about 10 nm to 1000 nm of material per pulse. In one embodiment, a plasma source is attached to the fuel injector and initiated by common methods such as microwave energy. In another embodiment of the invention, the sack void is filled with a solid. In one other embodiment, a high viscosity liquid is placed within the sack. In general, high-viscosity liquids preferably used in this invention should have a high damage threshold and have a diffusing property.

21 Claims, 1 Drawing Sheet

METHOD TO REDUCE DAMAGE TO BACKING PLATE

This invention is a continuation-in-part of copending U.S. patent application Ser. No. 08/859,020, filed May 20, 1997, and titled "Ultrashort Pulse Laser Machining of Metals and Alloys" the disclosure of which is incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to ultrashort pulse laser machining, and more specifically, it relates to techniques for machining layered materials and articles without affecting other than the first layer.

2. Description of Related Art

In many materials processing applications it is important to penetrate the work item frontal piece using some form of energy, laser beams or electron beams being examples, without causing damage to subsequent surfaces facing the laser or electron beam. One example of this is the need to place holes in fuel injectors without damaging the back surface of the sack in which the fuel is combusted. Damage to this back surface severely reduces the reliability of the overall fuel injector as its subsequent exposure to extremely high temperatures and pressures requires that the fuel injector be of very high integrity.

The mechanical structure of fuel injectors (or other components requiring that portions of the piece be machined without causing damage to the remainder of the piece) usually severely limits the strategies for machining. In the case of fuel injectors the back or subsequent surface encountered by the machining laser or electron beam is typically only some millimeters away from the machined surface. Therefore, a laser beam that is of high enough intensity to cut or drill the frontal piece remains high enough in intensity at the subsequent surface to damage it. One strategy that has been tried is to insert a flowing, absorbent liquid between the frontal piece and the back surface (fill the "sack"). Unfortunately, the severe constriction of the sack region does not allow the liquid to be flowed fast enough to avoid bleaching of the dye by high energy pulses from high repetition rate machining lasers. Another strategy has been to plug the sack region with a non-flowing absorbent solid. However, the energy absorbed by the absorbing solid is so great that it in turn heats up and damages the surrounding surfaces in the sack.

SUMMARY OF THE INVENTION

It is an object of the present invention to provide techniques for forming holes in a frontal piece of a workpiece without affecting a backing material.

It is another object of the present invention to provide techniques for forming holes in fuel injectors without affecting the second wall.

The present invention is a method for penetrating a workpiece using an ultra-short pulse laser beam without causing damage to subsequent surfaces facing the laser. Several embodiments are shown which place holes in fuel injectors without damaging the back surface of the sack in which the fuel is combusted.

In one embodiment, pulses from an ultra short pulse laser remove about 10 nm to 1000 nm of material per pulse. This occurs when the illumination fluence is near or below approximately 500–1000 milli-joules/cm$^2$ at the work piece. The injector may be trepanned and a diagnostic used to lower the laser illumination fluence to this level either as soon as the frontal piece is penetrated or just slightly before the frontal piece is penetrated.

In another embodiment, the intervening void (or sack) between the initial surface and the subsequent surface is filled with a gas that possesses a very large propensity to absorb photons from the short pulse laser. These gases would either absorb a majority of the energy from the laser beam prior to the beam reaching the back surface or would absorb enough energy to form a plasma of high enough density to shield the back surface. Similarly a simple monatomic or molecular gas could be used to absorb photons, forming a high density plasma, to shield the back surface.

In one embodiment, a plasma source is attached to the fuel injector and initiated by common methods such as microwave energy. The plasma so formed could be in contact with the sack region of the injector but would only flow into the sack region once an injector hole first penetrates the frontal piece, allowing the gas contained in the sack to diffuse through the penetration, drawing the plasma into the penetrated area.

In another embodiment of the invention, the sack void is filled with a solid. Once the injector hole penetration is made, the substance is drawn toward the penetration and through it due to the differential pressure existing on the material. The material absorbs photons and is ablated if subsequently illuminated by the machining laser beam. The result is that the machinist could choose to machine fuel injector holes by trepanning.

In one other embodiment, a high viscosity liquid is placed within the sack. In general, high-viscosity liquids preferably used in this invention should have a high damage threshold and have a diffusing property. This liquid would absorb photons during the "clean-up" of the hole, thereby preventing damage to the sack.

DETAILED DESCRIPTION OF THE INVENTION

Figure 1:
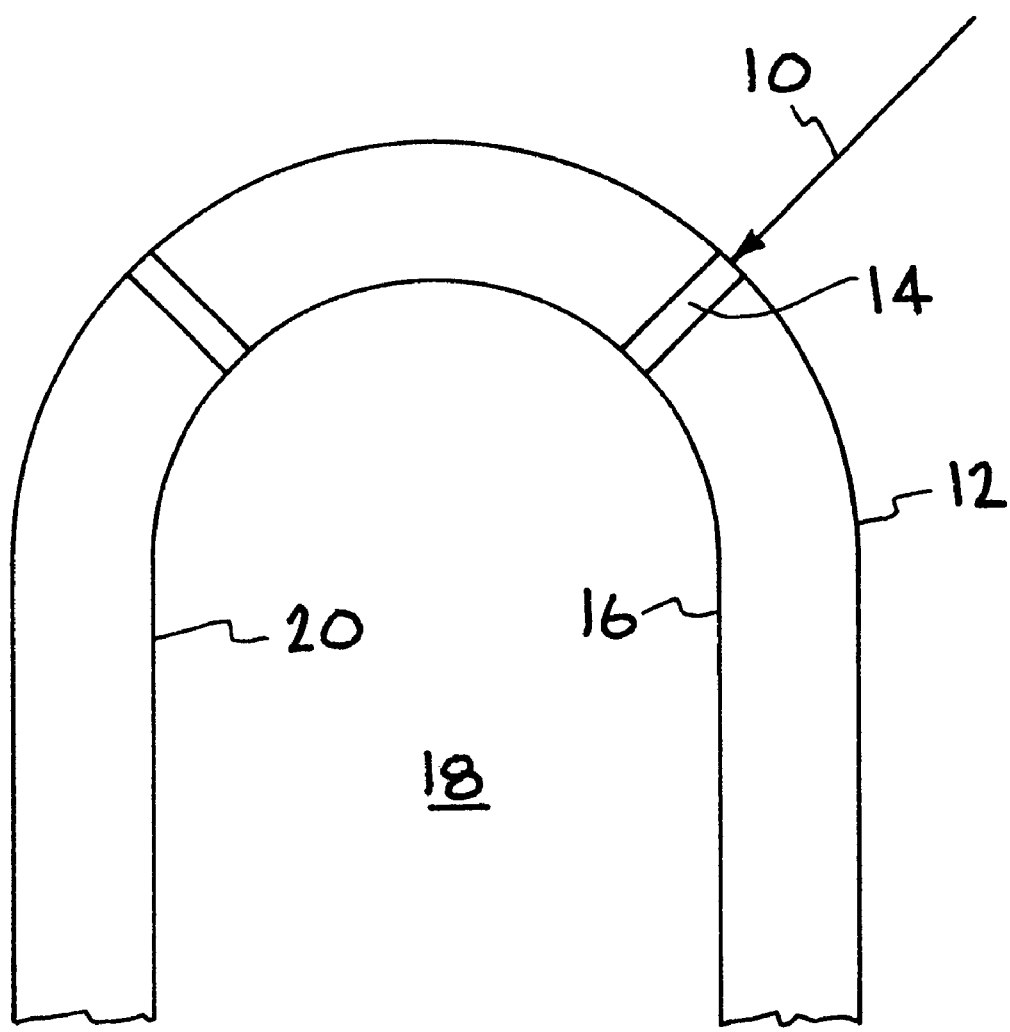
FIG. 1 shows a laser beam directed at a wall of a fuel injector shown in cross-section.

Machining with an ultra short pulse laser (commonly referred to as femtosecond or picosecond lasers), i.e., any laser with a pulse length shorter than about one hundred picoseconds, adds many new strategies to solving the above identified problem. Ultra short pulse lasers operate in a new regime of materials processing in that they couple their energy into the work piece through multiphoton absorption by the electrons in the lattice. This absorption occurs on a time scale shorter than the collision time between the hot electrons and the nuclei in the lattice. Excited electrons leave the work piece, leaving behind exposed ions in the lattice that then follow the electrons to preserve charge neutrality. The result is a machined piece with little or no heat affected zone in the boundary of the unmachined material. The key factors to consider are the lack of deposited heat in the work piece and the multiphoton nature of the energy absorption process. These factors may be exploited separately or together to solve the example problem of fuel injector machining (and related problems) referred to above.

Ultrashort pulse laser technology is described in U.S. Pat. No. 5,720,894, titled "Ultrashort Pulse High Repetition Rate Laser System For Biological Tissue Processing" and U.S. Pat. No. 5,960,016 titled "Aberration-Free, All-Reflective Laser Pulse Stretcher" the disclosures both of which are fully incorporated herein by reference.

The following methods are usable to machine one portion of a work piece without damaging subsequent surfaces encountered by the machining laser. The invention is generally usable for components that require that portions of the component be machined without causing damage to the remainder of the piece. One specific embodiment that is discussed is a technique for machining fuel injectors. A fuel injector is illustrated in FIG. 1. A laser beam 10 is directed at fuel injector 12 to produce a hole 14. It is undesirable for the laser beam to propagate through the injector wall 16 and the injectors intervening space 18 to cause any damage to the opposite wall 20.

As required, detailed embodiments of the present invention are disclosed herein. However, it is to be understood that the disclosed embodiments are merely exemplary of the present invention that may be embodied in various systems. Therefore, specific details disclosed herein are not to be interpreted as limiting, but rather as a basis for the claims and as a representative basis for teaching one skilled in the art to variously practice the present invention.

In one embodiment, an ultra short pulse laser can be operated in a regime in which it removes as little as about 10 nm of surface illuminated per pulse. This occurs when the illumination fluence is near or below approximately 500–1000 milli-joules/cm$^2$ at the work piece. The injector may be trepanned and a diagnostic used to lower the laser illumination fluence to this level either as soon as the frontal piece is penetrated or just slightly before the frontal piece is penetrated. The laser remains near this level of fluence during the subsequent "clean-up" operation on the machined hole or other feature. This method may be performed without a backing material (gas or other substance) or may be performed with a backing material as described in the following methods. A phase plate may be inserted into the beam to make the beam profile more flat. This will increase the tendency of the beam to punch through the workpiece more uniformly over the area of the beam. A deformable mirror or deformable membrane could also be used to adjust the beam profile.

In another embodiment, the intervening void (or sack) between the initial surface and the subsequent surface is filled with a gas that possesses a very large propensity to absorb photons from the short pulse laser. Examples of such gasses are $CO_2$, $SO_2$, $NO_2$, $CH_4$, and many other molecular species which have low lying electronic states easily excited by broadband near infrared or visible lasers through linear absorption or multiphoton absorption processes. These gases would either absorb all of the energy from the laser beam prior to the beam reaching the back surface or would absorb enough energy to form a plasma of high enough density to shield the back surface. Similarly a simple monatomic gas such as He, Ne, Xe, or Ar could be used to absorb photons, forming a high density plasma, to shield the back surface. Being of much lower viscosity than dye containing liquids, the gases could also be removed through the effect of vacuum pumping prior to the arrival of the next laser pulse.

In another embodiment of the invention, the sack void is filled with a solid, an example being a non-Newtonian solid of the type usually used to debur and smooth fuel injectors after they have been machined. Once the injector hole penetration is made, the non-Newtonian substance is drawn toward the penetration and through it due to the differential pressure existing on the material (the region near the laser beam is held at low pressure during the machining operation, near or below a millitorr, and the non-Newtonian fluid is mechanically pressed with continuous pressure into the sack during the machining operation). The non-Newtonian material absorbs photons and is ablated if subsequently illuminated by the machining laser beam but, unlike the case for lasers of pulse lengths longer than approximately 100 picoseconds which heat the illuminated material and vaporize only a portion of this material, the ultra short pulse laser either ablates the material it illuminates or leaves behind relatively cold unablated material in the boundary regions of the illuminated zone. The result is that the machinist could choose to machine fuel injector holes by trepanning. This well known technique uses the laser to only cut the outline of the fuel injector hole (cookie-cutter style) leaving a center plug which is ejected and an injector hole outline which must be cleaned up by numerous reilluminations of the boundary of the hole by the ultrashort pulse laser. This "clean-up" of the hole does not cause damage to the underlying sack due to the intervening non-Newtonian material that upon illumination is either ablated or left cold and intact in the neighboring regions of the illumination.

In one other embodiment, the non-Newtonian material or the gas could be replaced by a high viscosity liquid in the sack. In general, high-viscosity liquids preferably used in this invention should have a high damage threshold and have a diffusing property. Vacuum grease is an example of a high-viscosity liquid. This liquid would absorb photons during the "clean-up" of the hole, thereby preventing damage to the sack. Since it is not heated by the laser pulse it does not heat up and damage the surrounding portions of the fuel injector just as in the method using non-Newtonian material described above. Due to the high viscosity, this embodiment also allows a simple pump to maintain a low enough pressure (near or below a millitorr) on the laser beam illumination side of the work piece or fuel injector.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

We claim:

1. A method for machining a workpiece that has a backing material, comprising:

providing a workpiece having a front piece and a backing material;

directing a series of laser pulses at said front piece, wherein each laser pulse of said series of laser pulses has a pulse duration of less than about 50 picoseconds, wherein each said laser pulse has an illumination fluence of less than about 10 joules/cm$^2$, wherein material is removed from said front piece by each said laser pulse.

2. The method of claim 1, wherein the step of providing a series of laser pulses includes providing laser pulses at less than about 10 joules/cm$^2$ until said front piece is penetrated.

3. The method of claim 1, further comprising trepanning said front piece with said series of laser pulses.

4. The method of claim 1, wherein said workpiece comprises a fuel injector.

5. The method of claim 1, wherein the step of providing a series of laser pulses includes propagating said series of laser pulses through a phase plate to flatten the intensity profile of each said laser pulse.

6. The method of claim 1, wherein the step of providing a series of laser pulses includes propagating said series of laser pulses through a deformable mirror to flatten the intensity profile of each said laser pulse.

7. The method of claim 1, wherein an intervening space exists between said front piece and said backing material, wherein said intervening space is filled with a gas that possesses a very large propensity to absorb photons from said at least one laser pulse.

8. The method of claim 7, wherein said gas comprises a low lying electronic state that is easily excited by absorption processes selected from a group consisting of a linear absorption process or a multiphoton absorption process.

9. The method of claim 8, wherein said gas absorbs a sufficient amount of the energy from said at least one laser pulse such that said laser pulse is at a level below the ablation threshold of said backing material prior to said laser pulse reaching said backing material.

10. The method of claim 8, wherein said gas absorbs enough energy to form a plasma of high enough density to shield said backing material from said at least one laser pulse.

11. The method of claim 7, wherein said gas is selected from a group consisting of $CO_2$, $SF_6$, $NO_2$, and $N_2$.

12. The method of claim 10, wherein said gas is a monatomic gas.

13. The method of claim 12, wherein said monatomic gas is selected from a group consisting of He, Ne, Kr and Ar.

14. The method of claim 7, wherein said gas is removed and replaces from said intervening space between the firing of each said laser pulse.

15. The method of claim 1, wherein an intervening space exists between said front piece and said backing material, wherein said intervening space is filled with a solid.

16. The method of claim 15, wherein said solid comprises a non-Newtonian solid.

17. The method of claim 16, further comprising applying a differential pressure between said from piece and said intervening space, wherein said non-Newtonian solid is drawn through said hole due to said differential pressure.

18. The method of claim 17, wherein said front piece is held at low pressure and said non-Newtonian solid is mechanically pressed with continuous pressure into said intervening space, wherein said non-Newtonian solid absorbs photons and is ablated if illuminated by each said laser pulse.

19. The method of claim 1, wherein an intervening space exists between said front piece and said backing material, the method further comprising filling said intervening space with a high viscosity liquid.

20. The method of claim 19, wherein said high viscosity liquid exhibits a high laser damage threshold and has a diffusing property.

21. The method of claim 20, wherein said high viscosity liquid comprises vacuum grease.

* * * * *